(12) United States Patent
Ohba (10) Patent No.: US 8,360,526 B2
(45) Date of Patent: Jan. 29, 2013

(54) SEAT RECLINING APPARATUS FOR VEHICLE

(75) Inventor: Tetsuya Ohba, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 173 days.

(21) Appl. No.: 12/492,545

(22) Filed: Jun. 26, 2009

(65) Prior Publication Data

US 2010/0026071 A1 Feb. 4, 2010

(30) Foreign Application Priority Data

Jul. 29, 2008 (JP) ................................ 2008-194326

(51) Int. Cl.
*B60N 2/02* (2006.01)

(52) U.S. Cl. ..................... 297/367 R; 297/366; 297/362

(58) Field of Classification Search .............. 297/367 R, 297/366, 362
See application file for complete search history.

(56) References Cited

U.S. PATENT DOCUMENTS

| | | | |
|---|---|---|---|
| 6,003,945 A | 12/1999 | Kojima | |
| 6,039,400 A * | 3/2000 | Yoshida et al. | ........... 297/367 R |
| 6,554,361 B2 * | 4/2003 | Reubeuze et al. | ........ 297/367 R |
| 6,991,294 B2 * | 1/2006 | Choi | .......................... 297/367 R |
| 7,354,109 B2 * | 4/2008 | Oki | ............................. 297/367 R |
| 7,380,882 B2 * | 6/2008 | Oki | ............................. 297/367 R |
| 7,497,520 B2 * | 3/2009 | Assmann | .................. 297/367 R |
| 7,588,294 B2 * | 9/2009 | Matsumoto et al. | ...... 297/367 R |
| 7,703,852 B2 * | 4/2010 | Wahls et al. | .............. 297/367 R |
| 7,802,849 B2 * | 9/2010 | Tarusawa et al. | .......... 297/367 P |

FOREIGN PATENT DOCUMENTS

| | | |
|---|---|---|
| CN | 1496891 A | 5/2004 |
| JP | 2008-18108 A | 1/2008 |
| WO | WO 2005/100079 A2 | 10/2005 |

* cited by examiner

*Primary Examiner* — Laurie Cranmer (74) *Attorney, Agent, or Firm* — Foley & Lardner LLP

(57) ABSTRACT

A seat reclining apparatus includes a base member; a pivot member having an internal tooth gear; a cylindrical holder covering the outer circumference surface of the pivot member; a lock tooth having an external tooth gear arranged to be engaged with the internal tooth gear; and a cam arranged to push the lock tooth to engage or disengage the external tooth gear with or from the internal tooth gear; the pivot member including a bearing inner circumference surface located on the circular recessed portion, on the base member's side of the internal tooth gear in the axial direction, the base member including a circular support outer circumference surface on which the bearing inner circumference surface is slid, and the bearing inner circumference surface and the support outer circumference surface being arranged to position the pivot member relative to the base member in the radial direction.

10 Claims, 6 Drawing Sheets

SEAT RECLINING APPARATUS FOR VEHICLE

BACKGROUND OF THE INVENTION

This invention relates to a seat reclining apparatus for a vehicle which is arranged to adjustably fix an angle of a seat back relative to a seat cushion.

A vehicular seat reclining apparatus includes a body frame attached to a cushion arm of a seat cushion; a cover member attached to a back arm of a seat back, arranged to be pivoted relative to the base member, and including an internal tooth gear formed on an inner circumference surface of the cover member; and lock teeth attached to the body frame, and each having an external tooth gear. The relative pivot movement between the body frame and the cover member is restricted by the engagements between the external tooth gears of the lock teeth and the internal tooth gear of the cover member, so that the seat back is held in a predetermined angle position.

Recently, the thickness of the seat back becomes smaller. In a case in which the vehicular seat reclining apparatus provided between the cushion arm and the back arm has a large outside diameter (large external size), the vehicular seat reclining apparatus protrudes from an upper surface of the seat when the seat is in a full flat state. Therefore, it is required to decrease the outside diameter of the vehicular seat reclining apparatus.

In general, in a case in which the outside diameters (external sizes) of all of components are reduced for reducing the outside diameter (external size) of the seat reclining apparatus, the inside diameter of the internal tooth gear becomes small. Consequently, the tooth becomes small, and the strength decreases. In a case in which the number of the teeth reduces for reducing the outside diameter so as not to decrease the size of the tooth, and so as not to decrease the strength, the pitch angle of the pivot movement of the seat back with respect to the seat cushion becomes large when the external tooth gear is moved with respect to the internal tooth gear by one tooth. Therefore, it is required to reduce the outside diameter of the seat reclining apparatus without decreasing the strength, without increasing the pivot angle of the seat back by one tooth of the internal tooth gear.

Figure 1:
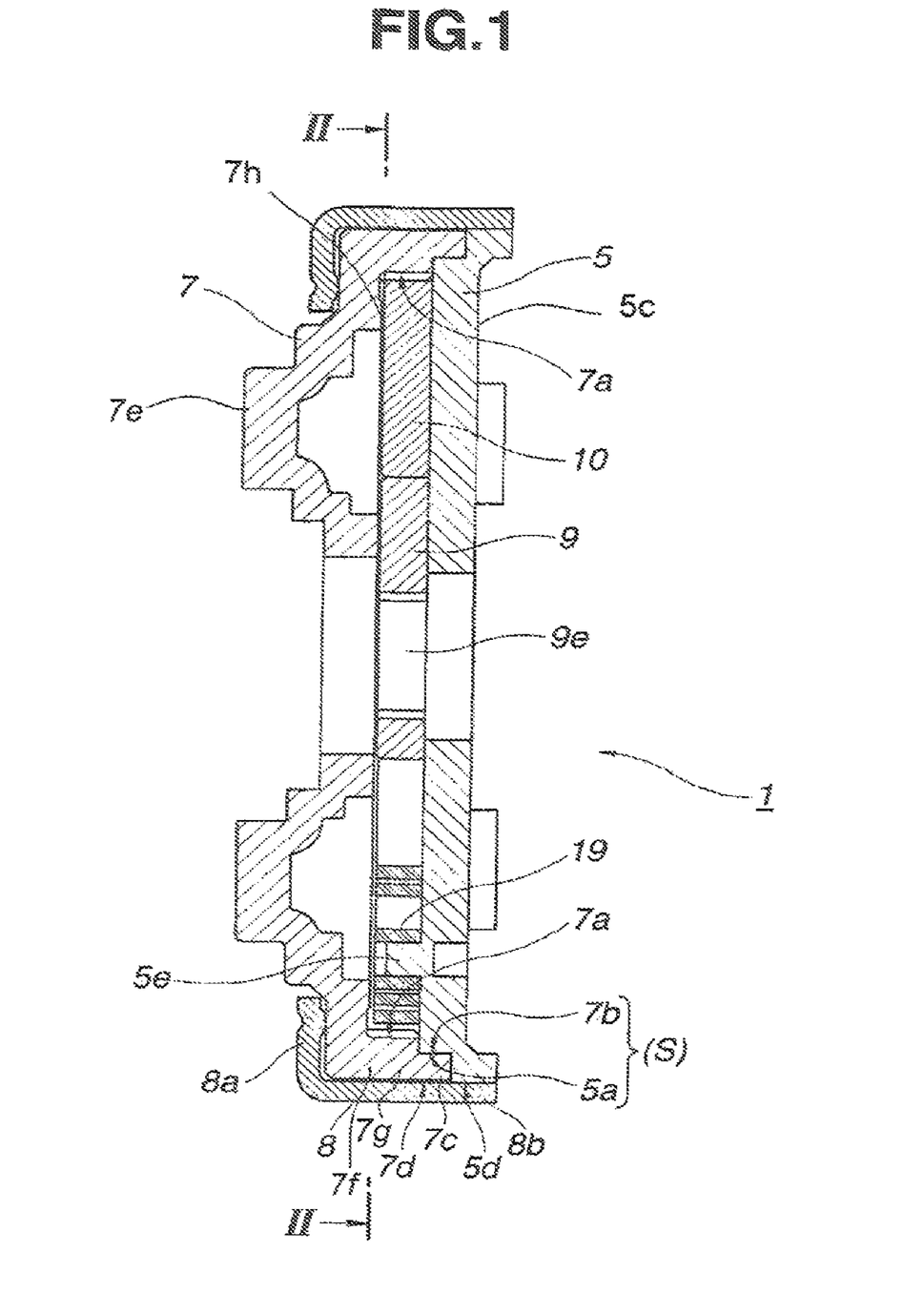
FIG. 1 is a sectional view taken along a section line of I-I of FIG. 2, and showing a seat reclining apparatus for a vehicle according to a first embodiment of the present invention.
Figure 3:
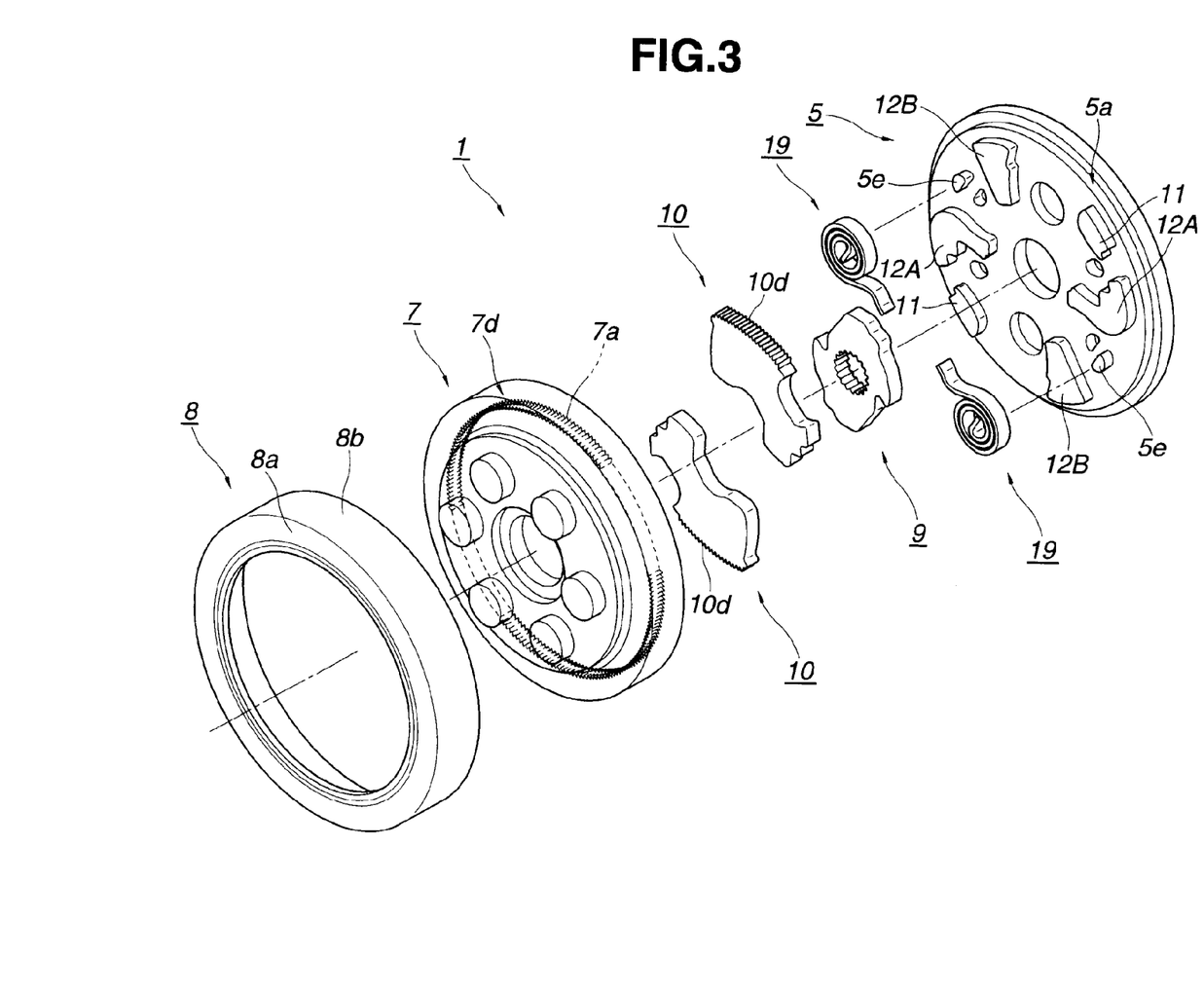
FIG. 3 is an exploded perspective view showing the seat reclining apparatus of FIG. 1.

A patent document 1 (Japanese Patent Application Publication No. 2008-18108) discloses, as a conventional vehicular seat reclining apparatus, a seat reclining apparatus including a body frame 5 connected with a seat cushion, a cover member 7 connected with a seat back, and a restricting member 8 through which the body frame 5 and the cover member 7 are held to be pivoted relative to each other, as shown in FIG. 1. An end portion of the restricting member 8 and an end portion of the body frame 5 are joined through welding bead 19 by the welding. Accordingly, in this conventional apparatus, it is unnecessary to provide a turned end portion of the restricting member 8 which is turned (bent) in a radially inner direction to cover an end surface of the body frame 5, as shown in FIG. 3. Therefore, it is possible to decrease a holding portion on the opposite side of the turned end portion, and thereby to decrease from S1 to S2, the radial size of a portion radially outside the outer circumference surface of the cover member 7. Therefore, it is possible to decrease the outside diameter of the vehicular seat reclining apparatus.

SUMMARY OF THE INVENTION

However, the sum of the outside diameter (external size) of the cover member 7, the thickness of the outer circumference portion of the body frame 5, and the thickness of the restricting member 8 is the outside diameter (external size) of the vehicular seat reclining apparatus. Therefore, the outside diameter of the seat reclining apparatus does not become sufficiently small.

It is an object of the present invention to provide a vehicular seat reclining apparatus devised to decrease an outside diameter, without varying an outside diameter of a cover member.

According to one aspect of the present invention, a seat reclining apparatus for a vehicle comprises: a base member connected with one of a seat cushion and a seat back pivotally fixed to the seat cushion; a pivot member connected with the other of the seat cushion and the seat back, and arranged to be pivoted in a circumferential direction relative to the base member, the pivot member including a circular recessed portion located on a base member's side, and having an internal tooth gear located on an inner circumference surface of the circular recessed portion; a cylindrical holder covering the outer circumference surface of the pivot member, and having a first end portion formed with an axial movement restricting portion arranged to position the pivot member relative to the base member in the axial direction, and a second end portion; a lock tooth having an external tooth gear arranged to be engaged with the internal tooth gear of the pivot member, and the lock tooth being arranged to be moved in a direction in which the external tooth gear is engaged with or disengaged from the internal tooth gear of the pivot member; and a cam arranged to push the lock tooth to engage the external tooth gear of the lock tooth with the internal tooth gear of the pivot member or to disengage the external tooth gear of the lock tooth from the internal tooth gear of the pivot member; the pivot member including a bearing inner circumference surface located on the circular recessed portion, on the base member's side of the internal tooth gear of the pivot member in the axial direction, the base member including a circular support outer circumference surface on which the bearing inner circumference surface of the pivot member is slid, and the bearing inner circumference surface of the pivot member and the support outer circumference surface of the base member being arranged to position the pivot member relative to the base member in the radial direction.

DETAILED DESCRIPTION OF THE INVENTION

Hereinafter, seat reclining apparatuses for a vehicle according to embodiments of the present invention are illustrated below.

First Embodiment

Figure 2:
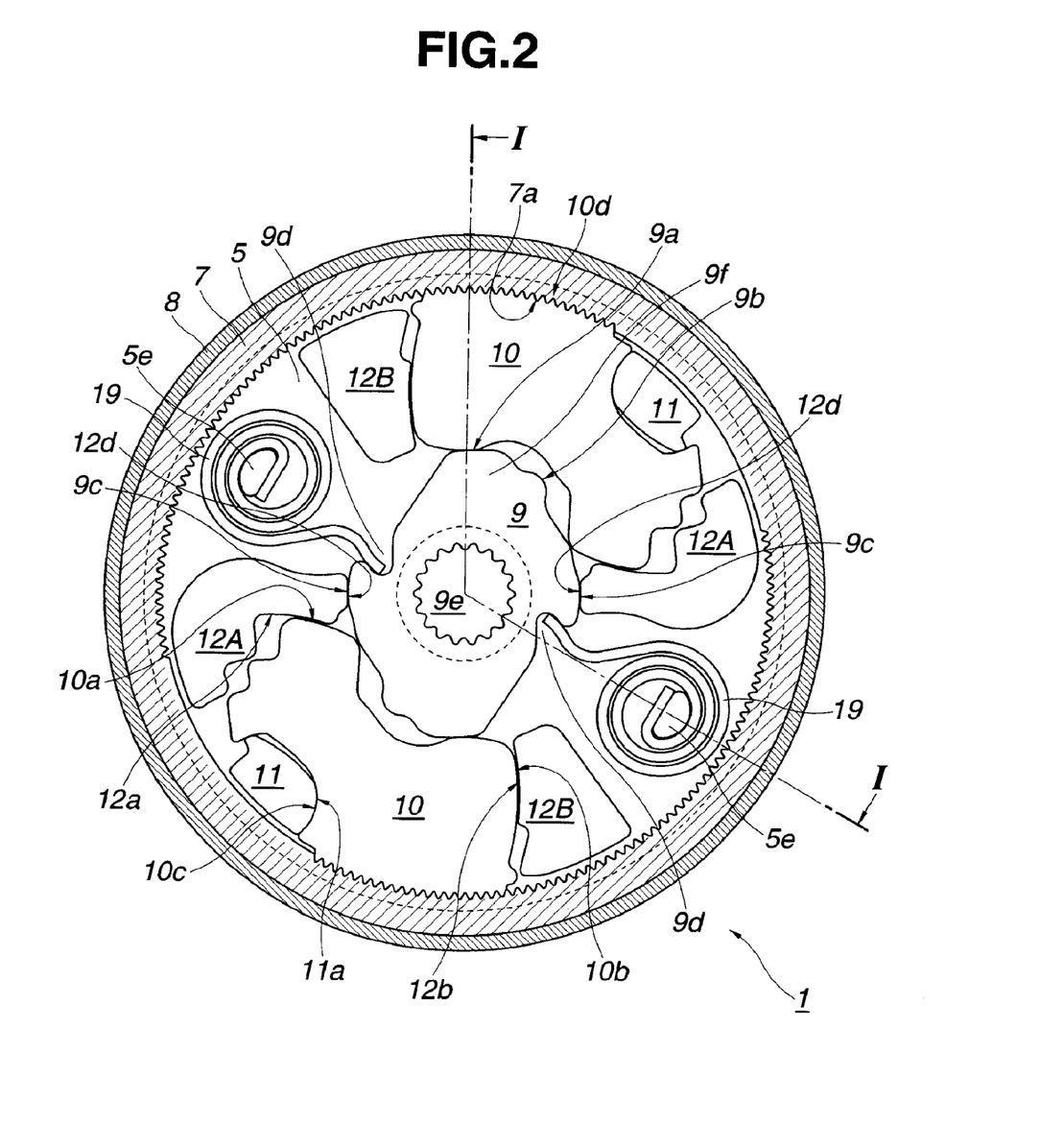
FIG. 2 is a sectional view taken along a section line of II-II of FIG. 1.
Figure 4:
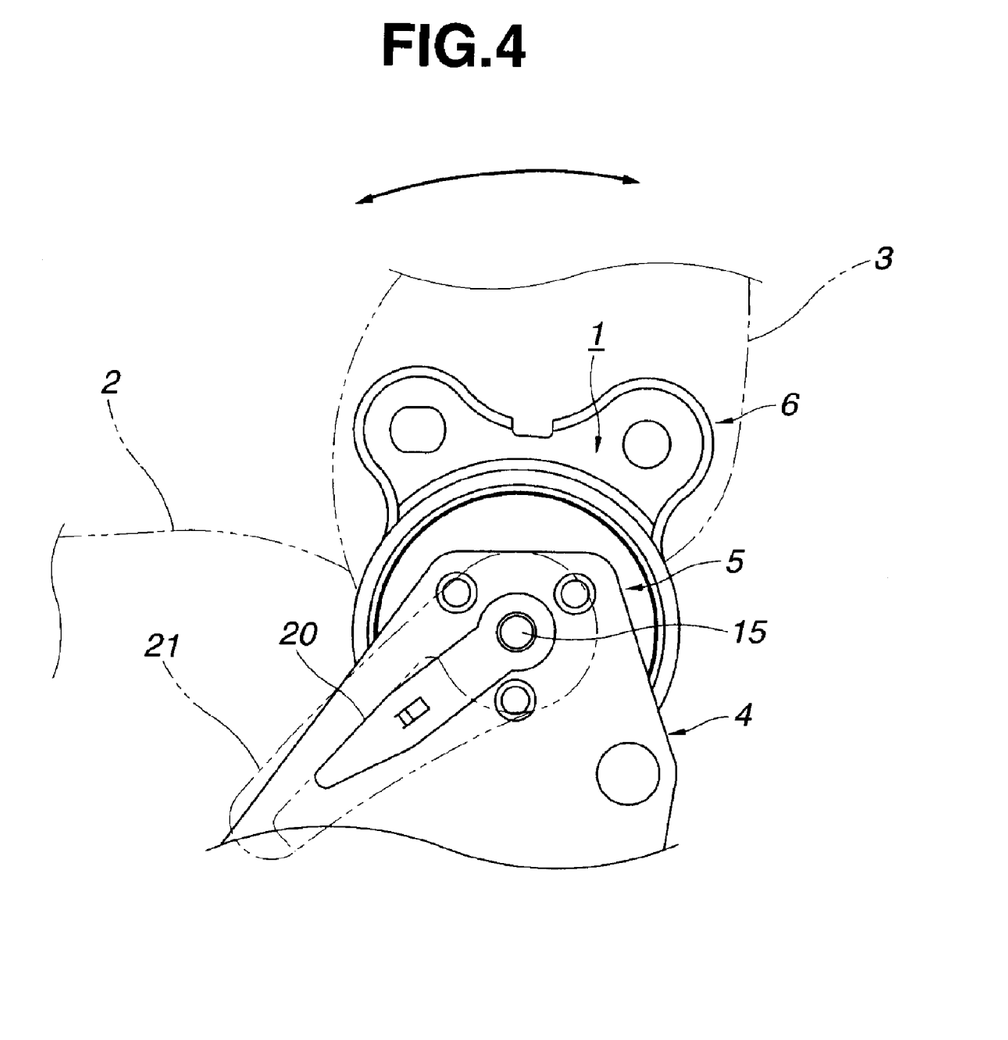
FIG. 4 is an external view showing a seat of the vehicle which can employ the seat reclining apparatus of FIG. 1.

FIG. 1 is a sectional view taken along a section line of I-I of FIG. 2, and showing a seat reclining apparatus for a vehicle according to a first embodiment of the present invention. FIG. 2 is a sectional view taken along a section line of II-II of FIG. 1. FIG. 3 is an exploded perspective view showing the seat reclining apparatus of FIG. 1. FIG. 4 is an external view showing a seat of the vehicle which can employ the seat reclining apparatus of FIG. 1.

As shown in FIG. 4, there are provided a seat cushion 2 which is a sitting portion (bottom portion), and a seat back 3 provided on a rear portion of the seat cushion 2 to be pivoted in forward and rearward directions of the vehicle. The seat cushion 2 is connected through a cushion arm 4 with a body frame (base member) 5. The seat back 3 is connected through a back arm 6 with a cover member (pivot member) 7. Moreover, there is provided a spring (not shown) arranged to urge the seat back 3 in a leftward direction of FIG. 4 (the forward direction of the vehicle) with respect to the seat cushion 2.

A seat reclining apparatus 1 shown in FIG. 1 includes the body frame 5 and the cover member 7. As shown in FIG. 1, the body frame 5 includes a circular recessed portion 5c (right side of FIG. 1) formed by half blanking by press. The cover member 7 includes a circular recessed portion 7h formed by bending a circular outer circumference portion into a flange shape by forging, and internal tooth gear 7a formed on an inner circumference surface of the circular recessed portion 7h. The cover member 7 is coaxially fit on or mounted on the body frame 5 to be pivoted relative to the body frame 5. The cover member 7 includes a bearing inner circumference surface 7b which is formed on the circular recessed portion 7h of the cover member 7 on the body frame 5's side (the right side of FIG. 1) of the internal tooth gear 7a in the axial direction, as shown in FIG. 1, and which is for supporting the cover member 7 to be pivoted relative to the body frame 5. The cover member 7 also includes cylindrical end portion 7c, base portion 7e, flange portion 7f and gear forming portion 7g. The body frame 5 includes a circular support outer circumference surface 5a formed on a back side of the circular recessed portion 5c of the body frame 5 which is formed by the half blanking, and arranged to be slid on the bearing inner circumference surface 7b of the cover member 7. On the other hand, the seat reclining apparatus 1 includes a cylindrical holder 8 covering the outer circumferential surface of the cover member 7 for positioning in the axial direction. The holder 8 includes a first end portion formed with an axial movement restricting portion 8a arranged to restrict the movement of the cover member 7 in the axial direction, and a second end portion 8b connected or joined with the body frame 5. In the connection of the second end portion 8b of the holder 8 and the body frame 5, an outside diameter of the body frame 5 is set substantially identical to an outside diameter of the cover member 7, and the holder 8 covers the outer circumference surfaces 5d and 7d of the body frame 5 and the cover member 7. The second end 8b of the holder 8 is connected with the outer circumferential surface 5d of the body frame 5 by the laser welding. This laser welding is performed by irradiating the laser from the outer side of the holder 8 toward a center of the holder 8. The laser is irradiated along the circumferential direction.

In this example, as shown in FIG. 1, the position in which the laser welding is performed to the outer circumference surface 5d of the body frame 5 is not radially outside the position of the sliding portion S in which the bearing inner circumference surface 7b of the cover member 7 and the support outer circumference surface 5a of the body frame 5 are positioned, and in which the body frame 5 and the cover member 7 are slid each other. Accordingly, even when the second end portion 8b of the holder 8 is welded to the outer circumference surface 5d of the body frame 5, the position of the outer circumference surface 5d which is a welded part is apart from the position of the sliding portion S in the radial direction. Therefore, it is not likely to generate the deformation at the sliding portion S by the welding heat, and it is possible to join by the welding. On the other hand, in a case in which the sliding portion S is positioned in the inner circumference surface of the circular recessed portion which is formed inside the outer circumference surface 5d of the body frame 5 as the conventional apparatus, the portion near the sliding portion S is deformed by the welding heat, so that the slidability of the cover member 7 with respect to the body frame 5 is decreased. Accordingly, it is not possible to join the holder 8 to body frame 5 by the welding.

The seat reclining apparatus 1 includes a pair of movable lock teeth 10 disposed between the body frame 5 and the cover member 7 in the axial direction. Each of the lock teeth 10 is swingable along arc lines (paths). The body frame 5 includes shaft portions 11 each of which is a substantially cylindrical shape, each of which is located radially inside one of the arc lines for guiding the corresponding lock tooth 10, and each of which has a center side guide surface 11a. The shaft portions 11 are integrally formed with the body frame 5. Each of the lock teeth 10 includes a bearing surface 10c formed by cutting a part of the lock tooth 10 into a substantially circular shape. On the other hand, the body frame 5 includes first and second guide raised portions 12A and 12B located near both ends of one of the arc lines for guiding the corresponding lock tooth 10, radially outside the one of the arc lines. The first and second guide raised portions 12A and 12B are integrally formed with the body frame 5. The first and second guide raised portions 12A and 12B include, respectively, first and second outer circumference guide surfaces 12a and 12b. Each of the lock teeth 10 includes first and second sliding outer circumference surfaces 10a and 10b which are slid, respectively, with the first and second outer circumference guide surfaces 12a and 12b. Each of the lock teeth 10 is swung along the corresponding arc line. Accordingly, all of the first and second outer circumference surfaces 12a and 12b and the first and second sliding outer circumference surfaces 10a and 10b have arc shapes which are coaxially arranged around the center of one of the shaft portions 11. Each of the lock teeth 10 includes an external tooth gear 10d formed on a surface confronting the internal tooth gear 7a of the cover member 7, and arranged to engage with one of the internal tooth gear 7a of the cover member 7.

Moreover, the seat reclining apparatus 1 includes a rotatable cam 9 arranged to push the lock teeth 10 each having the external tooth gear 10d, toward the internal tooth gear 7a of the cover member 7. When the cam 9 is pivoted about (around) the center hole 9e of the cam 9 in the counterclockwise direction, the cam 9 pushes the pair of the lock teeth 10 around the cam 9 in a radially outward direction, so that the external tooth gears 10d are engaged with the internal tooth gear 7a. Contrary, when the cam 9 is pivoted about (around) the center hole 9e of the cam 9 in the clockwise direction, the external tooth gears 10d are disengaged from the internal tooth gear 7a. The pivot movement of the cover member 7 with respect to the body frame 5 is restricted by the engagements of the external tooth gears 10d and the internal tooth gear 7a. Consequently, the seat back 3 is held in a desired angle position with respect to the seat cushion 2.

The cam 9 includes lock cam surfaces 9a each arranged to swing the lock tooth 10 around the shaft portion 11 in the clockwise direction of FIG. 2, and to engage the external tooth gear 10d with the internal tooth gear 7a, and unlock (lock release) cam surfaces 9b each arranged to swing the lock tooth 10 around the shaft portion 11 in the counterclockwise direction, and to disengage the external tooth gear 10d from the internal tooth gear 7a.

For preventing that one of the lock teeth 10 is engaged by the external tooth gear 10d pushed to the internal tooth gear 7a and the other of the lock teeth 10 is not engaged, the cam 9 is arranged to move in upward and downward directions of FIG. 2 which connect pushing portions 9f each of which has a large outside diameter (a large outer size), and each of which includes the lock cam surface 9a and the unlock cam surface 9b. The cam 9 is restricted so as not to move in the radial direction (the rightward and leftward directions in FIG. 2). That is, the cam 9 includes sliding outer circumference surfaces 9c which are located, respectively, on left and right sides of the cam 9, and each of which is an arc shape around the center hole 9e of the cam 9. Each of the first guide raised portions 12A includes a sliding contact surface 12d on which the sliding outer circumference surface 9c is constantly slid. On the other hand, there is provided no member arranged to support the cam 9 in the upward and downward directions. The cam 9 is directly abutted on the lock teeth 10 in a state in which the lock teeth 10 are movable in the upward and downward directions.

Moreover, the seat reclining apparatus 1 includes two lock springs 19 arranged to urge the cam 9 in the counterclockwise direction so as to constantly urge the external tooth gears 10d of the lock teeth 10 so that the external tooth gears 10d of the lock teeth 10 are engaged with the internal tooth gear 7a of the cover member 7. Each of the lock springs 19 is surrounded around a raised portion 5e which is a semicircular column, and which is integrally formed with the body frame 5. Each of the lock springs 19 includes a first end mounted on the corresponding raised portion 5e, and a second end retained by a retaining portion 9d formed on the outer circumference surface of the cam 9.

Thus-constructed vehicular seat reclining apparatuses 1 are disposed on the both sides of the width direction of the seat cushion 2. Operation shafts 15 of FIG. 4 are inserted, respectively, through serrations into the shaft holes 9e of the cams 9 of the vehicular seat reclining apparatuses 1 on the left and right sides. The operation shafts 15 are connected by a connection shaft (not shown). As shown in FIG. 4, an operation lever 20 is attached to the other end of one of the operation shafts 15. The operation lever 20 is provided with an operation knob 21.

Next, the operation of the vehicular seat reclining apparatus is illustrated below. In a state in which the vehicular seat reclining apparatus 1 is mounted (assembled) to the seat, the cam 9 is pivoted in the counterclockwise direction by the urging force of the lock springs 19 in the normal state, as shown in FIG. 2. In this state, the lock cam surfaces 9a push the lock teeth 10, and the lock teeth 10 are guided by the shaft portions 11 and first and second guide raised portions 12A and 12B. Each of the lock teeth 10 is swung around the corresponding shaft portion 11 in the clockwise direction, and the external tooth gears 10d are engaged with the internal tooth gear 7a of the cover member 7 (the lock state). That is, the pivot movement of the seat back 3 is restricted.

Next, the operation knob 21 is operated so that the operation shaft 15 is pivoted in the clockwise direction of FIG. 4 against the urging force of the lock springs 19. The engagements of the lock cam surfaces 9a of the cam 9 and the lock teeth 10 are released, and the unlock cam surfaces 9b push the lock teeth 10 in the opposite direction. Therefore, the lock teeth 10 are pivoted, respectively, around the shaft portions 11 in the counterclockwise direction, and the engagements between the external tooth gears 10d and the internal tooth gear 7a are released to become the unlock (lock release) state.

The seat back 3 and the back arm 6 attached to the cover member 7 are pivoted in the forward leaning direction by the urging force of the spring (not shown).

When the seat back 3 is pivoted in the rearward leaning direction against the urging force of the spring (not shown) and the operation knob 21 is released in a desired angle position of the seat back 3, the cam 9 is pivoted in the counterclockwise direction by the urging force of the lock springs 19. The lock cam surfaces 9a push, respectively, the lock teeth 10 in the clockwise direction around the shaft portions 11. Consequently, the external tooth gears 10d of the lock teeth 10 are engaged with the internal tooth gear 7a of the cover member 7, so that the seat reclining apparatuses return to the lock state.

In this embodiment, the bearing inner circumference surface 7b is formed on the circular recessed portion of the cover member 7. The body frame 5 includes the circular support outer circumference surface 5a arranged to be slid on the bearing inner circumference surface 7b of the cover member 7. Accordingly, it is unnecessary to use the outer circumference surface of the cover member 7 as the bearing surface pivotally supporting the cover member 7 with respect to the body frame 5. Therefore, it is unnecessary to provide a supporting portion for supporting the outer circumference surface of the cover member 7, to the outer circumference portion of the body frame 5. Consequently, it is possible to decrease the outside diameter (external size) of the vehicular seat reclining apparatus. Moreover, the inside diameter of the internal tooth gear 7a of the cover member 7 is identical to the inside diameter in the conventional apparatus. The size of the teeth is not varied, and accordingly the strength of the teeth is identical to the strength of the teeth in the conventional apparatus. Moreover, the pitch angle of the pivot movement of the seat back with respect to the seat cushion when the external tooth gears 10d are moved relative to the internal tooth gear 7a by one tooth are identical to the pitch angle of the pivot movement in the conventional apparatus.

In this embodiment, the only holder 8 is disposed radially outside the cover member 7. The outside diameter of the holder 8 becomes the outside diameter of the vehicular seat reclining apparatus. Therefore, it is possible to decrease the outside diameter (external size) of the vehicular seat reclining apparatus.

Second Embodiment

Figure 5:
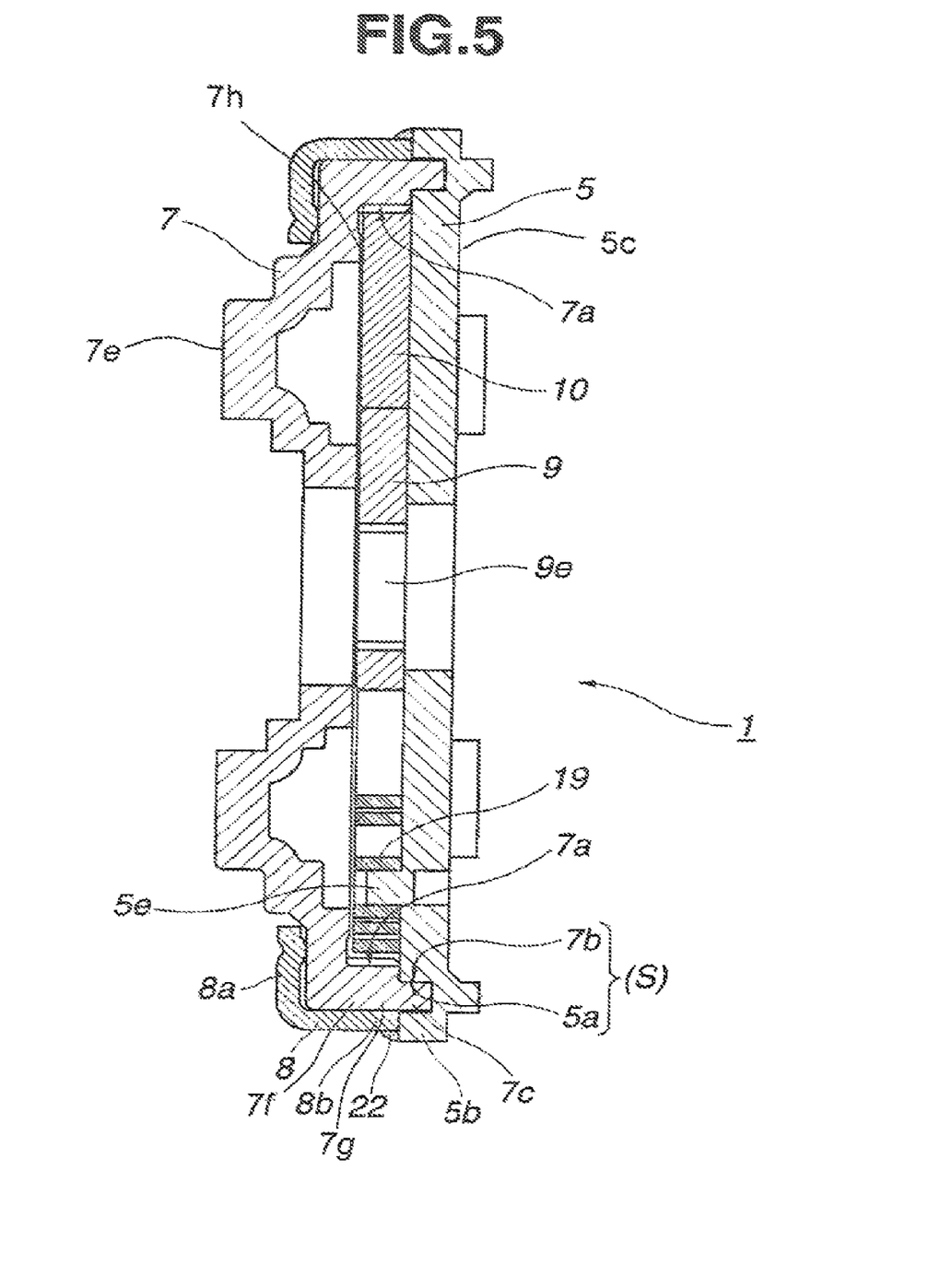
FIG. 5 is a sectional view showing a seat reclining apparatus for a vehicle according to a second embodiment of the present invention.
Figure 6:
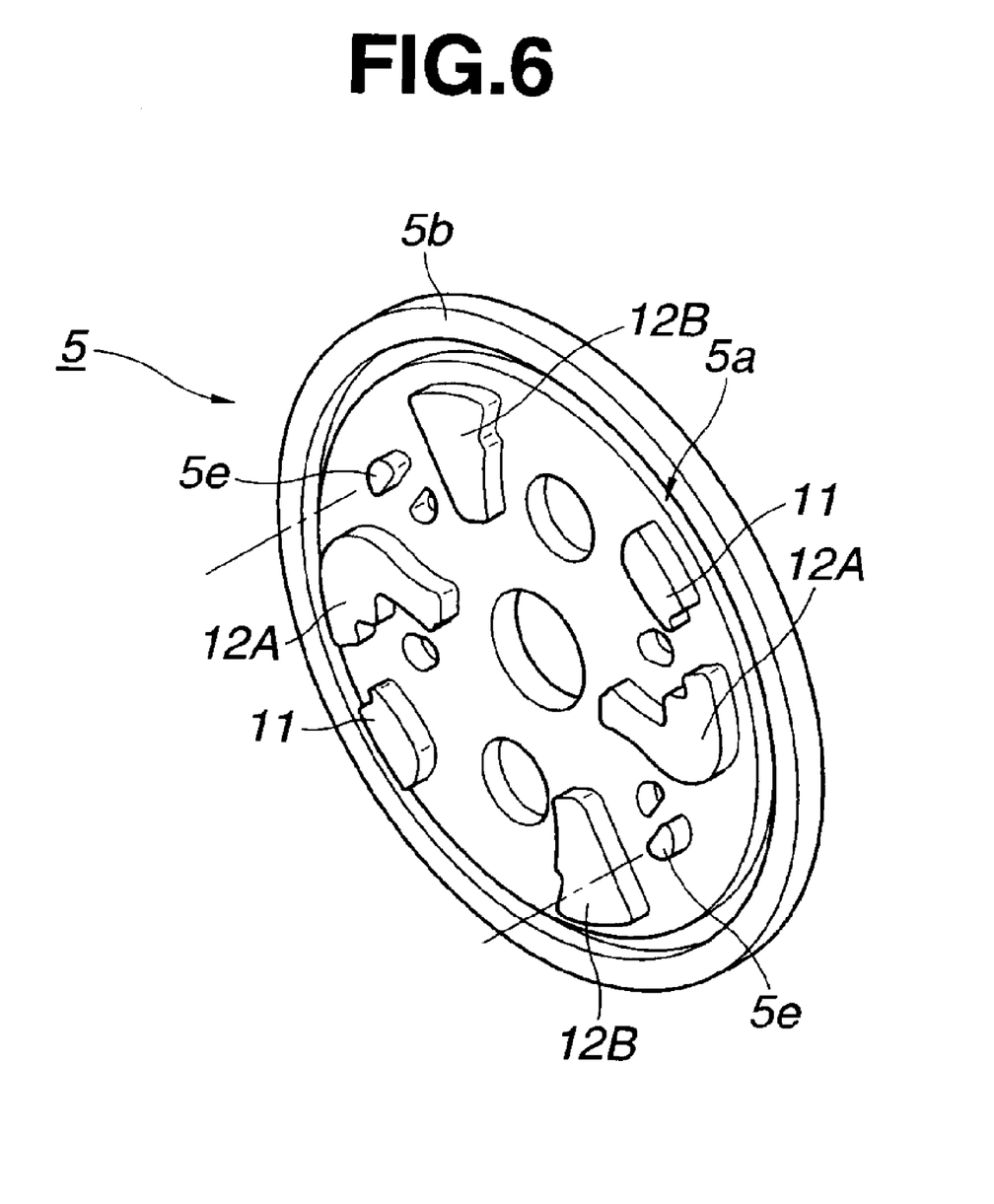
FIG. 6 is an exploded perspective view showing the seat reclining apparatus of FIG. 5.

The seat reclining apparatus according to the second embodiment is substantially identical to the seat reclining apparatus according to the first embodiment in most aspects as shown by the use of the same reference numerals. FIG. 5 is a sectional view showing a seat reclining apparatus for a vehicle according to a second embodiment of the present invention. FIG. 6 is an exploded perspective view showing the seat reclining apparatus of FIG. 5. FIG. 6 shows only portions varied from the seat reclining apparatus of FIG. 1.

As shown in FIG. 5, the body frame 5 includes a ring-shaped spread restricting portion 5b located radially outside the half blanking portion which is the circular recessed portion of the body frame 5, and integrally formed with the body frame 5. This spread restricting portion 5b is formed so as to cover an outer circumference surface (radially outer portion) of the cylindrical end portion 7c of the cover member 7 which is formed with the bearing inner circumference portion 7b. The axial end surface of the spread restricting portion 5b and the second end portion 8b of the holder 8 arranged to cover the outer circumference surface of the cover member 7 are joined by the arc welding. There is formed a welding portion 22.

In FIG. 1 of the patent document 1, in a case in which the second end portion of the restricting member 8 and the end surface of the cylindrical portion 5d of the body frame 5 are joined by the welding, the welding portion is near the sliding portion which is the inner circumference surface of the cylindrical portion 5d. Consequently, the portion near the sliding portion is deformed by the welding heat to affect the slidability. In this embodiment, the sliding portion S is located radially inside the outer circumference surface of the cover member 7, and the sliding portion S is apart from the spread restricting portion 5b of the body frame 5. Accordingly, the deformation by the welding heat is small. In this embodiment, the inner circumference surface of the spread restricting portion 5b is not the supporting surface pivotally supporting the cover member 7. Therefore, the heat does not affect the sliding surface S even when the second end portion 8b of the holder 8 is joined to the end surface of the spread restricting portion 5b by the welding. The slidability of the cover member 7 is stabilized.

In the seat reclining apparatus according to this embodiment, when the large external force is applied to the seat back and the cover member 7 receives the force for the pivot movement with respect to the body frame 5, the force in the radially outer direction is applied to the cylindrical end portion 7c formed with the internal tooth gear 7a and the bearing inner circumference surface 7b of the cover member 7, so as to spread the cylindrical end portion 7c of the cover member 7. However, in this embodiment, the ring-shaped spread restricting portion 5b formed to the body frame 5 restricts this spreading movement of the cover member 7. Accordingly, the ring-shaped spread restricting portion 5b and the holder 8 surely restrict this spreading movement of the cover member 7. Therefore, the engagements between the internal tooth gear 7a and the external tooth gears 10d are held, and the lock strength is improved. Moreover, the inner circumference surface of the spread restricting portion 5b is not the supporting surface for pivotally supporting the cover member 7. Accordingly, even when the end portion of the holder 8 is joined to the end surface of the spread restricting portion 5b by the welding, the heat does not affect the support outer circumference surface 5a, and the slidability of the cover member 7 is stabilized.

In the seat reclining apparatuses according to the first and second embodiments of the present invention, the second end 8b of the holder 8 and the body frame 5 are joined by the welding. However, it is possible to employ other joining structure.

The seat reclining apparatus according to the present invention includes a base member (5) connected with one of a seat cushion (2) and a seat back (3) pivotally fixed to the seat cushion (2); a pivot member (7) connected with the other of the seat cushion (2) and the seat back (3), and arranged to be pivoted in a circumferential direction relative to the base member (5), the pivot member (7) including a circular recessed portion located on a base member's side, and having an internal tooth gear (7a) located on an inner circumference surface of the circular recessed portion; a cylindrical holder (8) covering the outer circumference surface of the pivot member (7), and having a first end portion formed with an axial movement restricting portion (8a) arranged to position the pivot member (7) relative to the base member (5) in the axial direction, and a second end portion (8b); a lock tooth (10) having an external tooth gear (10d) arranged to be engaged with the internal tooth gear (7a) of the pivot member (7), and the lock tooth (10) being arranged to be moved in a direction in which the external tooth gear (10d) is engaged with or disengaged from the internal tooth gear (7a) of the pivot member (7); and a cam (9) arranged to push the lock tooth (10) to engage the external tooth gear (10d) of the lock tooth (10) with the internal tooth gear (7a) of the pivot member (7) or to disengage the external tooth gear (10d) of the lock tooth (10) from the internal tooth gear (7a) of the pivot member (7); the pivot member (7) including a bearing inner circumference surface (7b) located on the circular recessed portion, on the base member's side of the internal tooth gear (7a) of the pivot member (7) in the axial direction, the base member (5) including a circular support outer circumference surface (5a) on which the bearing inner circumference surface (7b) of the pivot member (7) is slid, the bearing inner circumference surface (7b) of the pivot member (7) and the support outer circumference surface (5a) of the base member (5) being arranged to position the pivot member (7) relative to the base member (5) in the radial direction. The pivot member (7) includes a base portion, and a flange portion protruding from an outer circumference portion of the base portion substantially in a direction to which the base portion is perpendicular, defining the circular recessed portion with the base portion, and including a cylindrical end portion (7c) having an inner circumference surface formed with the bearing inner circumference surface (7a), and an outer circumference surface; the flange portion of the pivot member (7) includes an inner circumference surface formed with the internal tooth gear (7a), and an outer circumference surface covered by the holder (8); and the internal tooth gear (7a) of the pivot member (7) is located between the cylindrical end portion (7c) and the base portion of the pivot member (7) in the axial direction.

Accordingly, the pivot member includes the bearing inner circumference surface formed on the circular recessed portion, and the base member includes the circular support outer circumference surface slid on the bearing inner circumference surface. Accordingly, it is unnecessary to use the outer circumference surface of the pivot member as the bearing surface pivotally supporting the pivot member with respect to the base member. Therefore, it is unnecessary to provide the support portion for supporting the outer circumference surface of the pivot member, to the outer circumference portion of the base member. Accordingly, it is possible to decrease the outside diameter (external size) of the vehicular seat reclining apparatus. Moreover, the inside diameter of the internal tooth gear of the pivot member is identical to the inside diameter in the conventional apparatus. The size of tooth is not varied. Accordingly, the strength of the teeth is identical to the strength of the teeth in the conventional apparatus. Moreover, the pitch angle of the pivot movement of the seat back with respect to the seat cushion when the external tooth gears are moved relative to the internal tooth gear by one tooth are identical to the pitch angle of the pivot movement in the conventional apparatus.

In the seat reclining apparatus according to the present invention, the base member (5) has an outside diameter substantially identical to an outside diameter of the pivot member (7); the holder (8) covers an outer circumference surface (5d) of the base member (5); and the second end portion (8b) of the holder (8) is joined with the outer circumference surface (5d) of the base member (5).

Accordingly, the only holder is disposed radially outside the pivot member. Accordingly, the outside diameter of the holder becomes the outside diameter of the vehicular seat reclining apparatus. Therefore, it is possible to decrease the outside diameter (external size) of the vehicular seat reclining apparatus.

In the seat reclining apparatus according to the present invention, the base member (5) includes a ring-shaped spread restricting portion (5b) integrally formed with the base member (5) by molding, and arranged to cover an outer circumference surface of a cylindrical end portion (7c) of the pivot member (7) which is formed with the bearing inner circumference surface (7b); and an end surface of the spread restricting portion (5b) is joined with the second end portion (8b) of the holder (8). The base member (5) includes a circumference groove located radially inside the spread restricting portion (5b); and the cylindrical end portion (7c) of the pivot member (7) is inserted into the circumference groove of the base member (5).

Accordingly, when the large external force is applied to the seat back and the pivot member receives the force for the pivot movement with respect to the base member, the force in the radially outer direction is applied to the cylindrical end portion formed with the internal tooth gear and the bearing inner circumference surface of the pivot member, so as to spread the cylindrical end portion of the cover member. However, in the seat reclining apparatus according to the embodiment of the present invention, the ring-shaped spread restricting portion formed to the base member restricts this spreading movement of the pivot member. Accordingly, the ring-shaped spread restricting portion and the holder surely restrict this spreading movement of the pivot member. Therefore, the engagement between the internal tooth gear and the external tooth gear is held, and the lock strength is improved. Moreover, the inner circumference surface of the spread restricting portion is not the supporting surface for pivotally supporting the pivot member. Therefore, even when the end surface of the holder is joined to the end surface of the spread restricting portion by the welding, the heat does not affect the support outer circumference surface of the base member. The slidability of the pivot member is stabilized.

The entire contents of Japanese Patent Application No. 2008-194326 filed Jul. 29, 2008 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A seat reclining apparatus for a vehicle comprising:
   a base member connected with one of a seat cushion and a seat back pivotally connected to the seat cushion;
   a pivot member connected with the other of the seat cushion and the seat back, and arranged to be pivoted in a circumferential direction relative to the base member, the pivot member including a circular recessed portion located on a base member's side, and having an internal tooth gear located on an inner circumference surface of the circular recessed portion;
   a cylindrical holder covering an outer circumference surface of the pivot member, and having a first end portion formed with an axial movement restricting portion arranged to position the pivot member relative to the base member in the axial direction, and a second end portion;
   a lock tooth having an external tooth gear arranged to be engaged with the internal tooth gear of the pivot member, and the lock tooth being arranged to be moved in a direction in which the external tooth gear is engaged with or disengaged from the internal tooth gear of the pivot member; and
   a cam arranged to push the lock tooth to engage the external tooth gear of the lock tooth with the internal tooth gear of the pivot member or to disengage the external tooth gear of the lock tooth from the internal tooth gear of the pivot member;
   the pivot member including a bearing inner circumference surface located on the circular recessed portion alongside the internal tooth gear, on the base member's side of the internal tooth gear of the pivot member in the axial direction,
   the base member including a circular recessed portion formed by half blanking by a press on a side opposite to the pivot member's side, and a circular support outer circumference surface which is formed on a back side of the circular recessed portion of the base member, and on which the bearing inner circumference surface of the pivot member is slid, and
   the bearing inner circumference surface of the pivot member and the support outer circumference surface of the base member being arranged to position the pivot member relative to the base member in the radial direction,
   wherein the pivot member includes a flange portion which is bent into a flange shape, which is located on an outer circumference portion of the pivot member, and which has an outer circumference surface having a substantially constant diameter; and the bearing inner circumference surface and the internal tooth gear are formed on an inner circumference surface of the flange portion so that the bearing inner circumference surface is formed alongside the internal tooth gear,
   wherein the base member comprises a guide raised portion having an outer circumference guide surface arranged to guide the lock tooth by contacting a sliding outer circumference surface of the lock tooth so that the lock tooth is moved in the direction in which the external tooth gear is engaged with or disengaged from the internal tooth gear of the pivot member.

2. The seat reclining apparatus as claimed in claim 1, wherein the base member has an outside diameter substantially identical to an outside diameter of the pivot member; the holder covers an outer circumference surface of the base member; and the second end portion of the holder is joined with the outer circumference surface of the base member.

3. The seat reclining apparatus as claimed in claim 1, wherein the base member includes a ring-shaped spread restricting portion integrally formed with the base member by molding, and arranged to cover the outer circumference surface of the flange portion of the pivot member which is formed with the bearing inner circumference surface; and an end surface of the spread restricting portion is joined with the second end portion of the holder.

4. The seat reclining apparatus as claimed in claim 1, wherein the pivot member includes a base portion, and the flange portion protruding from an outer circumference portion of the base portion substantially in a direction to which the base portion is perpendicular, defining the circular recessed portion with the base portion, and including a gear forming portion and a cylindrical end portion having the bearing inner circumference surface formed on an inner circumference side of the cylindrical end portion, the gear forming portion of the flange portion of the pivot member includes an inner circumference surface formed with the internal tooth gear, the outer circumference surface of the flange portion covered by the holder; and the internal tooth gear of the pivot member is located between the cylindrical end portion and the base portion of the pivot member in the axial direction.

5. The seat reclining apparatus as claimed in claim 4, wherein the holder covers the outer circumference surface of the flange portion of the pivot member and an outer circumference surface of the base member.

6. The seat reclining apparatus as claimed in claim 5, wherein the second end portion of the holder is joined with the outer circumference surface of the base member by welding.

7. The seat reclining apparatus as claimed in claim 5, wherein the support outer circumference surface of the base member is located radially inside the outer circumference surface of the base member.

8. The seat reclining apparatus as claimed in claim 5, wherein the support outer circumference surface of the base member is located between the base portion of the pivot member and the outer circumference surface of the base member in the axial direction.

9. The seat reclining apparatus as claimed in claim 4, wherein the base member includes a ring-shaped spread restricting portion integrally formed with the base member by molding, and arranged to cover the outer circumference surface of the flange portion of the pivot member; and an end surface of the spread restricting portion of the base member is joined with the second end portion of the holder by welding.

10. The seat reclining apparatus as claimed in claim 9, wherein the base member includes a circumference groove located radially inside the spread restricting portion; and the cylindrical end portion of the pivot member is inserted into the circumference groove of the base member.

* * * * *